UNITED STATES PATENT OFFICE.

HASCAL A. HOGEL, OF NEW YORK, N. Y., ASSIGNOR TO HIMSELF AND COSMORE G. BRUCE.

IMPROVEMENT IN TREATING BLOOD FOR THE PREPARATION OF FERTILIZERS, AND FOR OTHER PURPOSES.

Specification forming part of Letters Patent No. 100,629, dated March 8, 1870.

*To all whom it may concern:*

Be it known that I, HASCAL A. HOGEL, of the city, county, and State of New York, have invented "a new and improved article of manufacture and process for producing the same, which said article of manufacture is coagulated animal blood for agricultural, fertilizing, and other purposes;" and I do hereby declare that the following is a full, clear, and exact description of said process, which will enable others to conduct and operate the same.

In previous attempts to utilize animal blood evaporation and the application of acids have been resorted to without success.

My said invention of a process for producing the said new article of manufacture consists in subjecting the animal blood to the action of steam to coagulate it, and, when so coagulated, subjecting it to pressure to expel the water.

My said process may be worked in any suitable apparatus, such, for instance, as a rotating closed vessel having hollow journals, with which the steam-pipes from any suitable boiler are connected. The animal blood to be treated is introduced into the vessel through a manhole, which is then closed. The steam is introduced into the vessel, and, by the rotation of the vessel, the blood is agitated so as to enable the steam to act on every part of the mass. The steam may be saturated or superheated, and I have used it at a pressure of from thirty to forty pounds; but this may be varied. It will take from ten minutes to one hour to complete the coagulation, depending on the quantity. If treated in small quantities, the agitation may be produced by the action of jets of steam; but when operating on large quantities, instead of producing the required agitation by the rotation of the vessel, it may be effected by stirrers inside the vessel in manner well known and practiced in many chemical manufactures. After taking the coagulated blood from the vessel it is best to let it drain for a short time, and then it is put in a press and all the liquid matter forced out. After it comes from the press it can be kept for any length of time in the form of cake; but, if it be desired to granulate it in a short time, it will be found best to expose it to heat or currents of heated air, and then it may be pulverized in any suitable mill.

The coagulated blood, prepared as above described, is suitable not only as a fertilizer, but for other purposes in which animal blood is required to be used.

Having thus described my invention, what I claim, and desire to secure by Letters Patent, is—

1. The process, substantially as herein described, for coagulating blood to be used as a fertilizing agent or for other purposes.

2. As a new article of manufacture, coagulated blood, prepared substantially as set forth, for fertilizing or other purposes.

H. A. HOGEL.

Witnesses:
C. G. BRUCE,
SYDNEY E. SMITH.